ically done with the previously described known tile binder resins, to obtain lower melting materials.

The resin compositions of the present invention are also useful as valuable additives for vinyl polymers, having excellent compatibility with vinyl polymers and imparting improved flexural strength and other desirable properties thereto. The improved vinyl compositions can be used in the production of vinyl tile, vinyl phonograph records, slush and elastomeric molded vinyl products, vinyl pipe and other extruded vinyl products, industrial vinyl tapes, vinyl wall coverings, vinyl laminates and other calendered products, vinyl paints and paper coatings, and the like.

The resin compositions of this invention are further useful in the production of adhesives, for example as a tackifier for rubber in rubber cement, and in the production of rubber specialty products.

Thus, one object of this invention is to provide a tile binder resin which imparts superior properties to flooring tile.

Another object of the present invention is to provide tile of improved flexibility and improved resistance to greases, solvents, oils, and mild alkali solutions.

Still another object of the present invention to provide highly compatible additives for vinyl polymers, whose flexural strength is thereby improved.

These and other objects of the present invention will be apparent from the following description.

The resin compositions of the present invention comprise a blend of (A) a copolymer comprising a major proportion of styrene and a minor proportion of acrylonitrile and (B) a high-melting resinous polymer having a substantially higher softening point than copolymer A.

The styrene and acrylonitrile copolymer (A) comprises the product of thermally polymerizing from about 85 to about 98 parts by weight styrene and from about 2 to about 15 parts by weight acrylonitrile. The thermal polymerization is satisfactorily performed at a polymerization temperature of from about 350° F. to about 600° F., and a pressure of from about 350 to about 600 pounds per square inch over a period of from several minutes at the higher temperature to about 12 hours at the lower temperature. The said polymerization is preferably performed at a polymerization temperature of from about 400° F. to about 550° F. and a pressure of from about 400 to about 550 pounds per square inch over a period of from about 2 hours at the higher temperature to about 8 hours at the lower temperature. The polymerization is preferably performed in the presence of a solvent. Suitable solvents for this purpose are the aromatic solvents, such as benzene, toluene, xylene, and the alkylated naphthalenes. Generally, a lower molecular weight copolymer is formed by the use of high temperatures and highly alkylated solvents while higher molecular weight copolymer is produced at the lower temperatures and with non-alkylated solvents. A convenient quantity of solvent is an amount approximately equal in weight to the styrene reactant or the styrene and acrylonitrile reactants.

Polymer B is a high-melting resinous hydrocarbon polymer having a softening point of from about 275° F. to about 350° F. As an embodiment of this invention, it is preferred that polymer B have the following properties: a mixed aniline point of from about 30° C. to about 60° C., an Armstrong cloud point of from about 60° C. to about 120° C., a Gardner color of from about 10 to about 16, a Gardner 60% viscosity of from about

United States Patent Office 3,366,712
Patented Jan. 30, 1968

1

3,366,712
STYRENE-ACRYLONITRILE COPOLYMER-HIGH MELTING HYDROCARBON POLYMER BLENDS
John C. Tapas, Glenview, and Andrew Schor, Chicago, Ill., assignors to Velsicol Chemical Corporation, Chicago, Ill., a corporation of Delaware
No Drawing. Continuation-in-part of application Ser. No. 108,290, May 8, 1961. This application Oct. 13, 1966, Ser. No. 586,366
3 Claims. (Cl. 260—898)

ABSTRACT OF THE DISCLOSURE

A styrene-acrylonitrile resin composition consisting substantially of a blend of from about 30 to about 50 parts by weight of (A) a copolymer comprising from about 85 to about 98 parts by weight styrene and from about 2 to about 15 parts by weight acrylonitrile, and from about 50 to about 70 parts by weight of (B) a high-melting resinous hydrocarbon polymer having a softening point of from about 275° F. to about 350° F., said softening point being substantially higher than the softening point of copolymer A.

---

This application is a continuation-in-part of our copending application Ser. No. 108,290, filed May 8, 1961, now abandoned. This invention relates to new resinous compositions of matter useful in the production of improved flooring tile and in the manufacture of such products as phonograph records, calendered products such as tapes and laminates, and the like. More particularly this invention relates to resin compositions comprising blends of (A) a copolymer of styrene and acrylonitrile and (B) a high-melting hydrocarbon polymer.

The use of hydrocarbon resins for binding aggregate materials has been practiced for many years. A typical use of such materials is in floor tiles commonly known as asphalt tile. Asphalt tile usually consists primarily of plasticized resin as the binder, mineral fillers, such as limestone, asbestos, and the like, and pigments. Although this type of tile has found extensive use in some applications, they are relatively inflexible, and are attacked by solvents, oils, greases, and mild alkali solutions.

One improvement in asphalt tiles in recent years has been the use of styrene-acrylonitrile copolymer system as the binder resin to improve the solvent, oil and alkali resistance of the tile. Heretofore, this high-melting copolymer system was cut back with a low-melting plasticizer, which was then further plasticized to form the tile binder. However, although the grease, solvent, oil, and alkali resistance is improved, the other undesirable properties of asphalt tile were still retained by the tile. For example, the tile thereby produced is relatively inflexible, has a relatively loose and rough surface, wears poorly, and has poor indentation properties at higher temperatures, such as at 115° F.

The resin compositions of the present invention when used with vinyl polymers as tile-binder resins in the production of improved tile impart superior properties to the tile, giving the tile improved flexibility, excellent grease, solvent, oil and alkali resistance, improved indentation resistance, high flexural strength, and other desirable properties. Furthermore the use of the resin compositions of this invention in the production of tile eliminates the step of cutting back with low-melting plasticizers as is present- E to about Z, an iodine number of from about 50 to about 90, and a perbenzoic acid number of from about 2.0 to about 3.0 double bonds per kilogram resin. High-melting resinous hydrocarbon polymers of the above description are well known to those skilled in the art. These polymers can be any hydrocarbon polymeric composition having the above properties and can be prepared by methods known in the art from petroleum stocks, coal-tar stocks, and the like, or can be a polymer of several similar or different stocks. For example, procedures by which suitable Polymer B constituents can be prepared are described in Canadian Patent 571,761, column 4, lines 71–74; U.S. Patent 2,193,792, Example 5; U.S. Patent 2,521,022, Examples 6 and 7; U.S. Patent 2,773,051, Run No. 3; U.S. Patent 2,798,866; U.S. Patent 2,798,867, Example 1; and U.S. Patent 2,862,914, particularly the procedure of Example I therein. The last mentioned procedure is particularly preferred as a method by which Polymer B can be prepared.

The resin compositions of the present invention can be readily prepared by mixing copolymer A with polymer B and stripping the solvents and unreacted materials therefrom. The mixing can be readily carried out in a mixing tank or other agitated vessel at normal room temperature, although higher and lower temperatures can also be used. The mixed solution is then stripped of solvent by distilling in vacuo or if preferred by steam distillation. A final stripping temperature of from about 400° F. to about 600° F. at a pressure of from 1 to about 100 mm. mercury has been found to be convenient. It is preferred to strip the mixed solution to a final temperature of from about 425° F. to about 550° F. at a pressure of from about 5 to about 25 mm. mercury. The residue remaining after stripping is the valuable resin composition of the present invention.

The resin compositions of this invention produced by the process described herein, have many desirable properties and a high compatibility with vinyl polymer systems. Among its properties are:

| | |
|---|---|
| Softening point (ball and ring method), °F. | 255–325 |
| Mixed aniline point, °C. | 50–70 |
| Armstrong cloud point, °C. | 135–180 |
| Gardner color | 10–14 |
| Gardner viscosity (60%) | N–Z |
| Iodine number (0.15 gm.) | 15–25 |
| Deobase solubility | None |
| Heptane solubility | None |
| Cottonseed oil solubility | None |

The present invention provides flooring tile having superior properties, such as improved flexibility, improved indentation resistance, improved flexural strength, and excellent solvent, oil, grease, and alkali resistance. The binder for the flooring tile of this invention consists essentially of a resin of this invention, a vinyl copolymer, and a plasticizer. The binder generally constitutes between about 18 and about 30% of the tile, the remainder being fibrous materials such as asbestos, together with other fillers such as limestone, and pigments. A preferred tile filler mixture for use with the binders of the present invention comprises from about 25 to about 75 parts by weight limestone, from about 10 to about 50 parts by weight asbestos, and from 0 to about 15 parts by weight pigment. The use of the resin compositions of the present invention, with vinyl copolymers as the tile binder resin, results in tile having the superior properties heretofore described.

The vinyl polymers suitable for use with the resin compositions of the present invention include the various vinyl polymers and mixtures thereof. However, in the production of improved flooring tile it is preferred to use the vinyl chloride-vinyl acetate copolymers. Preferred vinyl chloride-vinyl acetate copolymers for the above-described use are those containing from about 75 to about 93 parts by weight vinyl chloride and from about 7 to about 25 parts by weight vinyl acetate.

Suitable plasticizers for use with the resin compositions of the present invention and the vinyl copolymers to form binders for the improved flooring tile described herein, include the phthalic acid ester-type plasticizers, such as dioctyl phthalate, dibenzyl phthalate, and the like, the phosphoric acid ester-type plasticizers, such as tricresyl phosphate, the solid and semisolid chlorinated hydrocarbon plasticizer compositions, and the like.

The preparation of products requiring plasticization, such as flooring tile binder, is readily accomplished by plasticizing the resin compositions of the present invention, or the vinyl copolymer, or a mixture of said resin composition and vinyl copolymer, with a plasticizer, such as those described above. Generally, it has been found satisfactory to utilize from about 12 to about 24 percent by weight plasticizer based on the total weight of the binder. A preferred quantity of plasticizer is from about 15 to about 21 percent by weight based on the total weight of the binder. For other products which do not require plasticization, for example, rigid vinyl pipe and fittings, and the like, the resin compositions of the present invention can be blended with the vinyl polymer without plasticizing either ingredient.

The following examples are set forth to illustrate the preparation and utility of the resin compositions of the present invention. It is understood that although particular proportions and conditions are specified in the examples for the purposes of illustration, the present invention is not limited thereto, but in each example there can be substituted other proportions and conditions falling within the previously described scope of the said proportion or condition.

*Example 1.—Preparation of a copolymer A*

Rubber grade styrene monomer (900 gm.), acrylonitrile (100 gm.), and toluene (1000 gm.) were placed in a round-bottom flask equipped with a mechanical stirrer, and stirred at normal room temperature until a homogeneous solution was formed. The solution was poured into a stainless steel pressure reactor. The reactor was sealed, and placed in a salt bath, which was maintained at 450° F., for 4 hours, and thereafter removed from the bath and allowed to cool to normal room temperature. An aliquot portion of the reaction solution was analyzed for polymer content by distilling off solvent and unpolymerized materials. In this manner it was determined that the copolymer A produced at these conditions constituted 48.3% of the polymerized solution and had the following typical properties:

| | |
|---|---|
| Softening point, °F. | 241 |
| Mixed aniline point, °C. | 65.0 |
| Armstrong cloud point, °C. | 231 |
| Gardner color | 7+ |
| Gardner viscosity (60%) | X+ |
| Iodine number, 0.15 gm. | 14.9 |
| Perbenzoic acid value, double bonds/kilogram resin | 0.6 |

*Example 2.—Preparation of a copolymer A*

Rubber grade styrene monomer (940 gm.), acrylonitrile (60 gm.), and toluene (1000 gm.) were mixed and treated as described in Example 1 to yield a solution of 48.7% of a copolymer A in solvent and unreacted materials. An aliquot sample of the solution of the thus produced copolymer A, when stripped of solvent and unreacted materials, had the following properties:

| | |
|---|---|
| Softening point, °F. | 236 |
| Mixed aniline point, °C. | 71.4 |
| Armstrong cloud point, °C. | 191 |
| Gardner color | 6+ |
| Gardner viscosity (60%) | V–W |
| Iodine number, 0.15 gm. | 12.6 |
| Perbenzoic acid value, double bonds/kilogram resin | 0.7 |

Example 3.—Continuous preparation of a copolymer A

Rubber grade styrene monomer (46.9% of total by weight), acrylonitrile (3.0% of total by weight), and toluene (the remainder by weight) were blended into a feed tank. The feed solution was pumped at a rate of 1.2 gallons per hour into the bottom of a vertical hollow cylindrical reactor heated by external heating to maintain a temperature of 410° F. at the bottom of the reactor, 460° F. at the center of the reactor, and 395° F. at the top of the reactor. The polymerized solution was piped from the top of the reactor through a back-pressure valve maintained at a pressure of 475 pounds per square inch, to a product-holding tank. The residence time in the reactor was approximately 4½ hours. Thus, a solution of a copolymer A in toluene and unreacted materials was continuously produced.

Example 4.—Preparation of a resin composition of the present invention

Copolymer A solution of Example 2 (916 gm.) and a solution of polymer B (544 gms. in 684 gms. of toluene) were placed into a 2-liter, three-necked, round-bottom flask fitted with a mechanical stirrer, a thermometer, and a side arm tube connected to a condenser, which in turn was connected to a cooled receiver. Said polymer B had the following properties:

| | |
|---|---|
| Softening point, ° F. | 303 |
| Mixed aniline point, ° C. | 46.3 |
| Armstrong cloud point, ° C. | 69 |
| Gardner color | 13+ |
| Gardner viscosity (60%) | L-M |
| Iodine number, 0.15 gm. | 68.9 |
| Perbenzoic acid value, double bonds/kilogram resin | 2.5 |

The resinous polymers, designated "polymer B," employed in this example can be prepared as described in U.S. Patent No. 2,862,914, particularly by the procedure of Example I therein.

The solutions were blended by stirring until a homogeneous solution formed and thereafter the resulting solution was distilled to an end point of 525° F. at 10 mm. mercury pressure. The vacuum was obtained by means of a water aspirator connected to the receiver. The residue upon cooling was a resin composition of the present invention and had the following desirable properties:

| | |
|---|---|
| Softening point, ° F. | 262 |
| Mixed aniline point, ° C. | 55.2 |
| Armstrong cloud point, ° C. approx. | 170 |
| Gardner color | 12+ |
| Gardner viscosity (60%) | T |
| Iodine number, 0.15 gm. | 21.6 |
| Deobase solubility | None |
| Heptane solubility | None |
| Cottonseed oil solubility | None |

Similarly the other examples of solutions of a copolymer A can be combined with other solutions of a polymer B in the various proportions described herein to yield the resin compositions of this invention having properties within the ranges previously described. For example, a resin composition having a softening points of 300° F. was obtained by blending and solvent stripping 72.4 parts by weight of the copolymer solution of Example 1 and a toluene solution of a polymer B (64.8 parts by weight polymer in 98.2 parts by weight toluene). Said polymer B had the following properties:

| | |
|---|---|
| Softening point, ° F. | 328 |
| Mixed aniline point, ° C. | 51.9 |
| Armstrong cloud point, ° C. | 102 |
| Gardner color | 13+ |
| Gardner viscosity (60%) | U-V |
| Iodine number (0.15 gm.) | 57.2 |
| Perbenzoic acid value, double bonds/kilogram resin | 2.2 |

As an illustration of the valuable utility of the resin compositions of the present invention the following example of the preparation and properties of a specific improved flooring tile is presented:

Example 5.—Preparation of an improved flooring tile

The following ingredients are charged into a mechanical mixer and blended until a homogeneous mass is obtained. All proportions are given in parts by weight:

| | |
|---|---|
| Vinyl copolymer (85% vinyl chloride-15% vinylacetate) | 11 |
| Di-octyl phthalate | 5 |

The homogeneous mass thus produced is placed on a heated mill and 11 parts of a resin composition produced by the method of Example 4 from 10.3 parts of the solution of Example 2 and 13.5 parts of the solution of a polymer B described in Example 4, were added to the mill and blended. Filler, composed of asbestos fibers, 24 parts; limestone, 44 parts; and titanium dioxide, 5 parts; were added to the mill and blended into a homogeneous mixture. The sheet thus formed was placed into a calender mill which produced a tile sample of 0.110 inch thickness. The sample thus produced had the following favorable properties:

| Indentation: | Mils |
|---|---|
| 77° F., 1 minute | 6.0 |
| 77° F., 10 minutes | 6.4 |
| 115° F., 30 seconds | 16.5 |

| Scratch Resistance: | Inches |
|---|---|
| Unexposed | 0.050 |
| $Na_3PO_4$ exposure | 0.050 |
| Cottonseed oil exposure | 0.055 |
| Kerosene exposure | 0.060 |

We claim:
1. A styrene-acrylonitrile resin composition consisting substantially of a blend of from about 30 to about 50 parts by weight of (A) a copolymer comprising from about 85 to about 98 parts by weight styrene and from about 2 to about 15 parts by weight acrylonitrile, and from about 50 to about 70 parts by weight of (B) a high-melting resinous hydrocarbon polymer having a softening point of from about 275° F. to about 350° F., said softening point being substantially higher than the softening point of copolymer A.

2. A styrene-acrylonitrile resin composition consisting substantially of a blend of from about 30 to about 50 parts by weight of (A) a copolymer comprising from about 85 parts to 98 parts by weight styrene and from about 2 to about 15 parts by weight acrylonitrile, and from about 50 to about 70 parts by weight of (B) a high-melting resinous hydrocarbon polymer having a softening point of from about 275° F. to about 350° F., said softening point being substantially higher than the softening point of copolymer A, a mixed aniline point of from about 30° C. to about 60° C., an Armstrong cloud point of from about 60° C. to about 120° C., a Gardner color of from 10 to 16, a Gardner 60% viscosity of from E to Z, an iodine number of from about 50 to about 90, and a perbenzoic acid number of from 2.0 to 3.0 double bonds per kilogram resin.

3. A styrene acrylonitrile resin composition consisting substantially of a blend of from about 35 to about 45 parts by weight of (A) copolymer comprising from about 88 to about 98 parts by weight styrene and from about 2 to about 12 parts by weight acrylonitrile, and from about 55 to about 65 parts by weight of (B) a high-melting resinous hydrocarbon polymer having a softening point of from about 275° F. to about 350° F., said softening point being substantially higher than the softening point of copolymer A, a mixed aniline point of from about 30° C. to about 60° C., an Armstrong cloud point of from about 60° C. to about 120° C., a Gardner color of from 10 to 16, a Gardner 60% viscosity of from E to Z, an iodine number of from about 50 to about 90, and a perbenzoic acid number of from 2.0 to 3.0 double bonds per kilogram resin.

References Cited

UNITED STATES PATENTS

| | | | |
|---|---|---|---|
| 2,798,866 | 7/1957 | Gordon et al. | 260—898 |
| 2,798,867 | 7/1957 | Gordon et al. | 260—898 |
| 2,862,914 | 12/1958 | Leary et al. | 260—898 |
| 2,970,978 | 2/1961 | Powers | 260—898 |

MURRAY TILLMAN, *Primary Examiner.*

J. L. WHITE, *Assistant Examiner.*